(12) United States Patent
Munzenberger et al.

(10) Patent No.: US 8,661,419 B2
(45) Date of Patent: Feb. 25, 2014

(54) METHOD, SYSTEM AND SIMULATION ANALYSIS MODEL FOR DATA PROCESSING

(75) Inventors: Ralf Munzenberger, Erlangen (DE); Matthias Dorfel, Emmering (DE)

(73) Assignee: Inchron GmbH, Erlangen (DE)

( * ) Notice: Subject to any disclaimer, the term of this patent is extended or adjusted under 35 U.S.C. 154(b) by 204 days.

(21) Appl. No.: 13/031,203

(22) Filed: Feb. 19, 2011

(65) Prior Publication Data

US 2011/0258709 A1 Oct. 20, 2011

Related U.S. Application Data

(63) Continuation of application No. PCT/EP2009/065972, filed on Nov. 27, 2009.

(30) Foreign Application Priority Data

Nov. 28, 2008 (DE) .......................... 10 2008 059 550

(51) Int. Cl.
*G06F 9/44* (2006.01)

(52) U.S. Cl.
USPC ............................ 717/135; 717/134; 717/140

(58) Field of Classification Search
USPC .................................................. 717/134–140
See application file for complete search history.

(56) References Cited

U.S. PATENT DOCUMENTS

| | | | |
|---|---|---|---|
| 6,618,856 B2 * | 9/2003 | Coburn et al. ................ | 717/135 |
| 7,117,261 B2 * | 10/2006 | Kryskow et al. .............. | 709/223 |
| 7,152,028 B2 * | 12/2006 | Jahnke ........................... | 703/22 |
| 7,334,222 B2 * | 2/2008 | Keller ............................ | 717/135 |
| 7,509,246 B1 * | 3/2009 | Molson et al. ................. | 703/13 |
| 8,079,022 B2 * | 12/2011 | Seneski et al. ................ | 717/135 |
| 8,087,007 B2 * | 12/2011 | Duneau ......................... | 717/135 |
| 8,141,060 B2 * | 3/2012 | Raghavan et al. ............ | 717/135 |
| 8,271,964 B2 * | 9/2012 | Zorn et al. ..................... | 717/140 |
| 8,527,941 B2 * | 9/2013 | Clark ............................. | 717/105 |

OTHER PUBLICATIONS

Touraille et al, "A Model-Driven Software Environment for Modeling, Simulation and Analysis of Complex Systems", ACM, pp. 229-237, 2011.*
Arifin et al, "P-SAM: A Post-Simulation Analysis Module for Agent-Based Models", ACM, pp. 1-8, 2010.*
Sanchez et al, "Exploring the World of Agent-Based Simulations: Simple Models, Complex Analyses", ACM, pp. 116-126, 2002.*
Brandao et al, "Analysis of Nonstationary Stochastic Simulations Using Classical Time-Series Models", ACM Trans. on Modeling and Computer Simulation, vol. 19, No. 2, pp. 1-26, 2009.*

* cited by examiner

*Primary Examiner* — Anil Khatri
(74) *Attorney, Agent, or Firm* — Kilpatrick Townsend & Stockton LLP

(57) ABSTRACT

The method of the invention for preprocessing data before providing the data to a user of the data for further processing the data at the user of the data, comprising the steps of (a) selecting, by the data provider, at least one part of the data from the entire data to be provided to the user for further processing, depending on at least one give criterion which the user fulfils; (b) hiding the selected data such that despite being hidden from the user, the selected data can be further processed and/or executed after the provision.

16 Claims, 1 Drawing Sheet

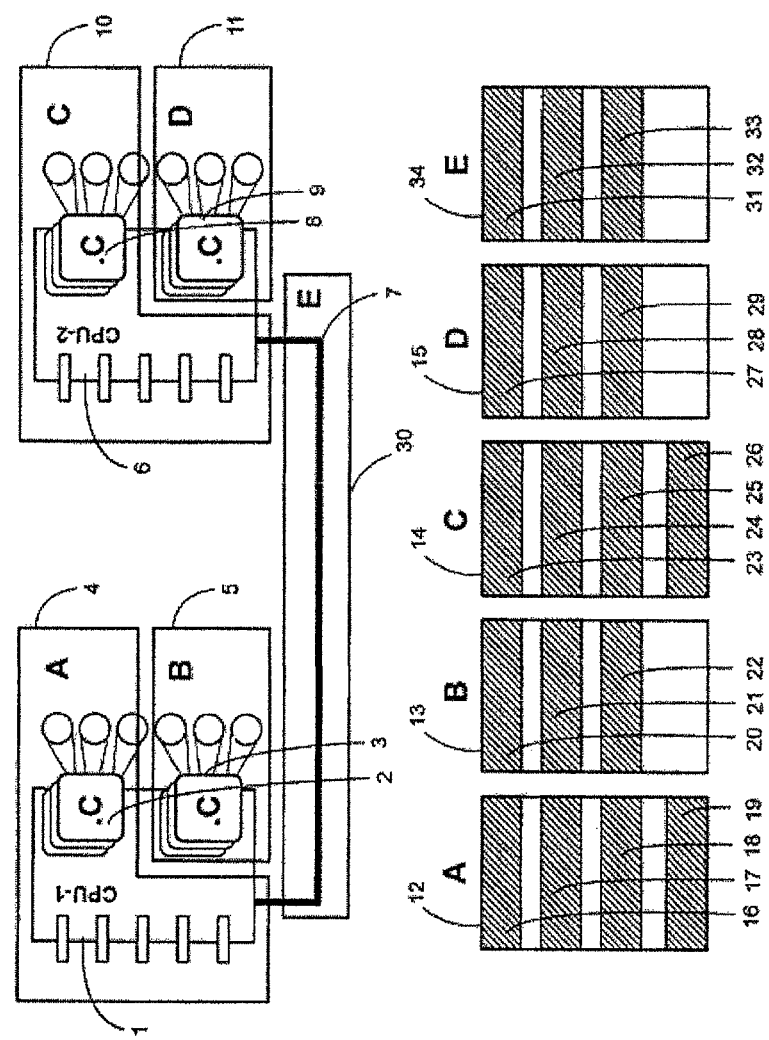

METHOD, SYSTEM AND SIMULATION ANALYSIS MODEL FOR DATA PROCESSING

CROSS-REFERENCES TO RELATED APPLICATIONS

The present application is a continuation, and claims benefit, of International Application No. PCT/EP2009/065972 filed on Nov. 27, 2009, which claims benefit of German Patent Application No. 10 2008 059 550.0 filed on Nov. 28, 2008. The contents of these applications are incorporated herein by reference in their entirety as if set forth herein.

TECHNICAL FILED

The present invention relates to a method, system and simulation or analysis model for data processing, in particular for preprocessing data before providing the data to a user of the data for further processing of the data at the user of the data. In particular the invention relates to a computer-based method and simulation or analysis model for data processing.

BACKGROUND OF THE INVENTION

It is often the case in the field of information technology that client and contractor jointly work at a complex embedded system. This system can have a plurality of processors for which both client and contractor develop software components. The distribution of the software can be defined along the processor limits. The whole system only jointly exhibits the required functionality, wherein it is essential that the interaction of the software components for client and contractor meets real-time requirements.

BRIEF SUMMARY OF THE INVENTION

Both simulation and analysis are to be used to prove the required real-time capability. Neither clients nor contractors are interested in revealing more than is absolutely necessary about their subsystem. Preferably, it is the object of the present invention to encapsulate and hide the details necessary for the analysis or simulation of the whole system so that no further information except the intended results are revealed about the subsystem to the respective other party.

This object can be achieved by the subject-matter in the independent claims.

The present invention achieves the above-mentioned object and provides a computer-based method for preprocessing data before providing the data to a user of the data for further processing the data at the user of the data. The method comprises the steps of (a) selecting, by the data provider, at least one part of the data from the entire data to be provided to the user for further processing, depending on at least one given criterion which the user fulfils, (b) hiding the selected data such that despite being hidden from the user, the selected data can be further processed and/or executed after the provision.

The data are preferably one or more software components. The data are preferably one or more software components of a complex embedded system. The interfaces of the hidden software component can remain visible for the user.

The data user preferably verifies the real-time capability of the one or more software components.

The data provider and the data user are thus able to provide only a part of the complex embedded system, but to use the whole system by interaction of the individual parts.

By hiding the selected data in step (b), the data user is enabled to obtain results by executing the entire data without being able to see the entire data.

A license dongle can be used as user criterion.

The data preferably represent a simulation and/or analysis model. The selected data can preferably represent one or more task models.

The selected data are preferably hidden by encoding.

Steps (a) and (b) can also be carried out at the data user, wherein the original data user is then preferably regarded as data provider and the original data provider as data user.

This iteration can be repeated several times.

The data are preferably provided in the following computer language formats, XML (eXtensible Markup Language), UML (Unified Modeling Language), C, C++, "MATLAB" and "SIMULINK" script, Python, Pascal, Fortran or Basic. The MATLAB and SIMULINK products are available from The MathWorks of Natick, Mass., USA.

According to a further aspect of the present invention, a computer system is provided to carry out the method for preprocessing data before providing the data to a user of the data for further processing the data at the user of the data. The computer system comprises a selection device for selecting by the data provider of at least part of the data from the entire data to be provided to the user for further processing depending on at least a given criterion fulfilled by the user. Furthermore, the computer system comprises a unit for hiding the selected data such that the selected data can be further processed or executed after the provision despite being hidden from the user.

According to a further aspect of the present invention, a computer program is provided for carrying out the above-described method.

According to a further aspect of the present invention, a computer-based method for simulating and/or analyzing a whole system, comprising at least two parts, is provided. The method comprises the steps of: receiving data representing one or several parts of the whole system from one or more data providers, wherein the data are preprocessed from at least one data provider according to the above described method; packetizing the received data by the data user to build the whole system; and analyzing and/or simulating the whole system by the data user.

The data user for forming the whole system in step (b) preferably adds own data, representing a further part of the whole system, to the received data.

The data may represent one or more software components. The data are preferably one or more software components of a complex embedded system. The interfaces of the hidden software component preferably remain visible for the user.

The data preferably represent a simulation and/or analysis model. The selected data preferably represent one or more task models.

According to a further aspect of the present invention, a chip with a program for carrying out the above described method is provided.

According to a further aspect of the present invention, a digital storage medium with a program for carrying out the above described method is provided.

According to a further aspect of the present invention, a simulation and/or analysis model is provided, comprising a first data object controlling the access to the further data objects, a second data object forming the outer interface of the simulation and/or analysis model, a third data object containing the contents of the simulation and/or analysis model as data to be further processed, and a fourth data object containing the simulation and/or analysis model as prepared executable simulation.

The first data object preferably controls the access of the user of the simulation and/or analysis model to the interface information of the second data object, to the further processable data of the third data object and to the prepared executable simulation of the fourth data object by taking given access authorization information into account.

The given access authorization information in the first data object can be stored on a license dongle.

Preferably at least one of the access authorization information of the data, which can be further processed or executed, of the third data object and the executable data of the fourth data object are encoded.

The first data object preferably denies the access of the user to the further processable data of the third data object, but permits the access of the user to the prepared executable simulation of the fourth data object, whereby the simulation and/or analysis model is made hidden and/or not further processable but executable for the user.

Preferably, at least a part of the further processable data of the third data object describes the dynamic time response of the simulation and/or analysis model.

The further processable data of the third data object can have a source code and the prepared executable simulation of the fourth data object can be generated by the generation of a simulation model, such as described, e.g., in WO 2007/051634 A2.

The source code of the third data object is preferably in XML, UML, C, C++, MATLAB or SIMULINK script, Python, Pascal, Fortran or Basic format.

The executable data of the fourth data object may be present for example in an intermediate representation or in precompiled form.

The prepared executable simulation of the fourth data object can be embedded in a software environment of the user in an executable comprehensive model.

The simulation and/or analysis model forms preferably a hierarchical part of a superordinate simulation and/or analysis model. The simulation and/or analysis model preferably forms a model or submodel of an embedded system Preferably at least a part of the contents of the simulation and/or analysis model is assigned as further processable data of the third data object and the executable data of the fourth data object to at least a task of a control device.

The simulation and/or analysis model can be used for real-time analysis.

Contrary to Digital Rights Management (DRM), which also provides encoding for a specific group of people (proprietors of licensed players) and the automatic further processing, the method of the present invention interconnects the user's own contents with the encoded contents, which are thus usable for environments and simulations not contemplated during encoding.

The data standard AUTOSAR (AUTomotive Open System Architecture) provides for the exchange of XML data describing parts, modules and whole systems. However, in this case, the sender always reveals all information about his components, and the further transmission or the purpose of use cannot be restricted either.

BRIEF DESCRIPTION OF THE DRAWING

FIG. 1 is a block diagram of a system constructed in accordance with the invention.

DETAILED DESCRIPTION OF THE INVENTION

The invention will be subsequently described in detail with preferred embodiments.

Some terms used in the description of the invention are explained as follows:

Exporting a Project

Exporting is particular process, which generates a special description from a project of party 1, which in turn can be imported at party 2. The parts of the project marked as hidden by party 1 are completely visible at party 1, however, they are only visible as Black Box at party 2. Party 2 may carry out an analysis or simulation of the whole project, but does not see details of the parts of the project marked by party 1 as hidden.

Importing a Project

Importing of a project takes place in a tool, which generates therefrom a project that can be simulated or analyzed. The parts of the sender marked as hidden are visible as Black Box and can be used, but cannot be inspected.

Hidden

This term means that a component is visible as Black Box and can also be used in a simulation or analysis. However, inspecting it, i.e., recognizing details of the inner life is neither possible in project view nor in the simulation or analysis results.

Black Box

A black box having an interface definition with which it can be connected to the remaining system. It also comprises a (hidden) simulation or analysis model which can be used. Inner details of the Black Box are not visible.

Intended Recipient

When exporting a project, the user can choose from which recipient an element marked as hidden should be usable. Only said users can use the imported project in a simulation or analysis. The recipient list of elements which the user already received (imported) as hidden cannot be changed (in particular supplemented) anymore.

An individual installation of a tool or a license dongle can be indicated as recipient. The individual installation corresponds to a personalized recipient whereas the connection to the license dongle, in particular in case of a network license, corresponds to a whole company.

In order to be able to select a recipient for an exported process, the recipient has to generate a corresponding cryptographic key and send it to the sender. The sender has to add this key accordingly into his system. The relationships between senders and recipients build a network of relationships of trusts that can be compared to the Network of Trust of PGP/GnuPG.

PGP/GnuPG (Pretty Good Privacy/GNU Privacy-Guard)

Quasi-standard for asymmetrical encoding of e-mails and other documents which can only be decoded again by the intended recipients.

Encoding p In the present case encoding always means the use of acknowledged cryptographic methods. Therefore, asymmetric algorithms (DSA (Digital Signature Algorithm), RSA (for Rivest, Shamir, Adleman)), symmetric algorithms (AES (Advanced Encryption Standard)) and hash algorithms (SHA (Secure Hash Algorithm)) can be used. Specific methods are always named subject to a license examination.

The method according to the present invention is described with exemplary embodiments.

Step 1: At the Contractor

The whole system is established by the contractor. A project is defined, which contains the required processors and their wiring. In addition, task models for the part of the software components to be developed are defined. For the software components of the client, too, task models are generated according to the specification in the tender. The interaction between software components and their real-time characteristics can be tested by the contractor by means of appropriate scenarios.

In the next step the contractor marks the task models of his software components as hidden and exports the project. The thus generated file contains all parts not marked as hidden openly visible and the parts marked as hidden in the encoded form, which can only be processed by the intended recipient. This file is then preferably transferred from client to contractor.

Step 2: At the Client

The client imports the transmitted file in his too. The parts of the system not marks as hidden are just as visible to client and editable as if he himself had entered them into the project. Parts, which have been marked as hidden and for which he was named as the authorized recipient, are visible as Black Box. Said parts are reduced to their interface definitions. The simulation or analysis is possible by a stored model, which, however, is no longer visible.

When the transmitted file is imported by someone not named as authorized recipient, the parts marked as hidden by the contractor are neither visible to him nor usable in a simulation or analysis.

The client can now examine the system. Every part, also the parts marked as hidden, can be replaced by own task models of any level of abstraction. It is appropriate to improve the system parts corresponding to his system components by more precise task models. The correct functioning of the project can be subsequently tested by simulation or analysis.

The thus improved parts are subsequently marked as hidden. It is appropriate that export of the project by the client is carried out in a version corresponding to the previously imported version except for the improvement of the parts marked as hidden. The client sends the exported project back to the contractor.

Step 3: At the Contractor Again

The contractor first loads the project which has been originally exported and imports the file sent back by the client. By taking the differences between the versions, the tool recognizes which alterations have been performed by the client and incorporates these parts into the project. In this context task models are replaced by Black Boxes marked as hidden. Other improvements, too, which have not been marked as hidden, are incorporated.

The contractor performs a simulation or analysis of the modified project and can thus assess the real-time capability of the whole system.

The parts marked by the contractor as hidden in Step 1 are now visible again from the original creator. Details are visible and can be assessed and altered.

Step 4: A New Iteration

The course of Steps 1 to 3 can now start anew. Every participant improves his task models, marks the confidential components as hidden and exports the project for the partner. Said partner may then assess the alterations in the context of his components.

EXAMPLES

Data Embedding

In the following the present invention is described by means of an exemplary project. Momentarily such projects are encoded in XML. An expansion by parts marked as hidden could be as follows:

```
<model>
    <submodel name="controlloop">
        <interface>
            <connection> ... </connection>
        </interface>
        <implementation mode="hidden">
    <receivers> ... CDATA .n </receivers>
    <data id="3"> n. CDATA n. </data>
    <data id="4"> ... CDATA on </data>
        </implementation>
    </submodel>
    <submodel name="basepart">
        <interface>
            <connection> on </connection>
        </interface>
        <implementation mode="visible" type="c">
            <file>src/a.c</file>
            <task name="Process1">
                <entry>src/a.c/mainFunction</entry>
            </task>
        </implementation>
        </submodel>
<model>
```

A model consisting of two submodels is shown. The submodel named "controlloop" is not visible according to the described invention. The submodel named "basepart" is visible for all data users. In the non-visible submodel, the XML tag <connection> corresponds to the second data object forming the outer interface of the partial-simulation model, and the XML tag <receivers> to the first data object controlling the access to the further data objects. The XML tag <data> with ID 3 corresponds to the third data object containing for authorized users the contents of the partial-simulation model as further processable data, and the tag <data> with ID 4 corresponds to the fourth data object containing for authorized users the partial-simulation model as prepared executable simulation. Thus, the developer of the submodel "controlloop" can provide the finished submodel to the developer of the submodel "basepart" for testing the whole system in a simulation and analysis environment without revealing secret expert knowledge (for example control algorithms for a characteristic engine sound).

Hiding can theoretically take place at every hierarchy level. When unpacking the encoded data stream, XML structures result which are again parsed.

Data Evaluation

When the object is imported, an element marked as hidden is only displayed with the help of its type, name and interface description. Not until for analysis or simulation are the encoded data accessed.

The user cannot alter attributes of the data obtained. Thus, the encoded model remains consistent with the remaining system. When the user stores a project, the model is further stored in encoded form.

Data Encoding

Standard methods are used for encoding. Typically, the data actually to be protected are encoded with an arbitrarily generated key. The cyphertext creates the data in the above-described tag <data>. The key itself is encoded with the public key of the recipient according to an asymmetric encoding method. This is done individually for each recipient. The list of the key thus enciphered for each recipient of the data can be protected makes up the content of the above-mentioned tag <receivers>.

The encoded model and the list of enciphered keys are embedded as dataset into the surrounding data format.

Access by the user to the encoded data must not be possible. The tools has to take the corresponding measures.

The description of the system in exported state has to make sense. This means basically an automatic process ability, which differs from the interpretation by the visible part.

This means concretely. The description of the interfaces of a component is visible for the user. The corresponding encoded simulation description, however, is only reasonably interpretable for the tool.

A text file without semantics is a counter example: Hiding a paragraph or chapter from the user renders the entirety useless since the document cannot be automatically interpreted without further information.

Example of Use Visibility of Components of a Simulation Model

The following example of use, as shown in FIG. 1, shows a whole system consisting of five components: A (4), B (5), C (10), D (11) and E (30). The communication between the two processors takes place via a CAN (Car Area Network)-bus (7). Component A consists of CPU-1 (1) and several operating system tasks and interrupt service routines (2) and is generated by the data provider as simulation model. Component B consists of a plurality of operating system tasks (3) and is generated by the data provider as simulation model. Component C consists of CPU-2 (6) and a plurality of operating system tasks and interrupt service routines (8) and its generated by the data provider as simulation model. Component D consists of a plurality of operating system tasks (0) and is generated by the data provider as simulation model. Component E consists of a CAN-bus (7) and is generated by the data provider as simulation model Data container A (12) contains the first (16), second (17), third (18) and fourth data object (19) of component A (4). Data container B (13) contains the first (20), second (21) and third data object (22) of component B (5). Data container C (14) contains the first (23), second (24), third (25) and fourth data object (26) of component C (10). Data container D (15) contains the first (27), second (28) and third data object (29) of component D (11). Data container E (34) contains the first (31), second (32) and third data object (33) of component E (30).

User 1 is data provider and data user for component A and data user of component B. User 2 is data provider of components B and E and data user of components A, B, C, D and E. User 3 is data provider of components C and D.

User 1 intends to examine the behavior of subsystem 1 consisting of components A and B in a simulation. Component B required therefor is provided by data provider 2 as data container B. Access to the third data object (22) is controlled by the first data object (20). It is visible and simulatable for data user 1. User 2 intends to carry out a simulation of the whole system. Therefore, he requires apart from his own components B and E, component A from data provider 1 and components C and D from data provider 3. The two components A and C are not visible for him and are respectively exported by the data provider as hidden and provided. For the simulation, data provider 1 provides the fourth data object (19) of his component A and data provider 3 the fourth data object (26) of his component C. The third data objects of these two components are not visible—access is controlled by the respective first data object. The interfaces of components A and C are usable for data user 2 in the simulation since they are provided as second data objects. Component D can be inspected by data user 2 since he has to see the internal dynamic behavior for his analyses. Thus, data provider 3 permits inspection of the third data object (29)—the access is controlled by the first data object (27). The list of the authorized data users for the fourth data objects can be empty, which means that a fourth data object, for components B, D and E is not required. User 3 carries out a simulation of subsystem 2 consisting of the two components C and D. He does not need any further components therefor.

What is claimed is:

1. A computer apparatus comprising:
   a first processor;
   a digital storage medium adapted to store data comprising a simulation analysis model executable by the first processor of the computer apparatus, the simulation analysis model of the data comprising:
   a first data object;
   a second data object forming an outer interface of the simulation analysis model;
   a third data object comprising contents of the simulation analysis model as further processable data; and
   a fourth data object comprising the simulation analysis model of the third data object as prepared executable simulation;
   wherein the simulation analysis model forms a hierarchical part of a superordinate simulation analysis model; and
   wherein the first processor of the computer apparatus operate operates according to the data stored in the digital storage medium such that the first data object controls access to the further processable data of the third data object and to the prepared executable simulation of the fourth data object, and such that the first data object controls access to the further data objects based on predetermined access authorization information.

2. The simulation analysis model according to claim 1, wherein the access authorization information is stored in the first data object.

3. The simulation analysis model according to claim 2, wherein at least one of the access authorization information of the further processable data of the third data object and the prepared executable simulation of the fourth data object are encoded.

4. The simulation analysis model according to claim 1, wherein the access authorization information is stored in a license dongle.

5. The simulation analysis model according to claim 1, wherein the first data object denies access to the further processable data of the third data object, but permits access to the executable simulation of the fourth data object, whereby the simulation analysis model is made hidden but executable.

6. The simulation analysis model according to claim 1, wherein at least a part of the further processable data of the simulation analysis model of the third data object specifies the time behavior of the simulation analysis model.

7. The simulation analysis model according to claim 1, wherein the further processable data of the third data object comprises source code, and the prepared executable simulation of the fourth data object is generated by a simulation model from the source code of the third data object.

8. The simulation analysis model according to claim 7, wherein the source code of the third data object is in a predetermined format.

9. The simulation analysis model according to claim 7, wherein the executable data of the fourth data object are present in an intermediate representation.

10. The simulation analysis model according to claim 7, wherein the prepared executable simulation of the fourth data object is embedded in a software environment of the user in an executable comprehensive model.

11. The simulation analysis model according to claim 1, wherein the simulation analysis model comprises a model of an embedded system.

12. The simulation analysis model according to claim 11, wherein at least a part of the further processable data of the third data object and the prepared executable simulation of the fourth data object is assigned to a task of a control device.

13. The simulation analysis model according to claim 1, wherein the simulation analysis model is executable for real-time analysis.

14. The simulation analysis model according to claim 1, wherein the apparatus further includes a second processor, and the first processor and the second processor operate according to the data stored in the digital storage medium such that the first data object controls access to the further processable data of the third data object and to the prepared executable simulation of the fourth data object, and such that the first data object controls access to the further data objects based on predetermined access authorization information.

15. A computer apparatus comprising:
a first processor;
a digital storage medium adapted to store containing data comprising a simulation analysis model executable by the first processor of the computer apparatus, wherein the simulation analysis model of the stored data comprises a first data object, a second data object forming an outer interface of the simulation analysis model, a third data object comprising contents of the simulation analysis model as further processable data, and a fourth data object comprising the simulation analysis model of the third data object as prepared executable simulation;
wherein the simulation analysis model forms a hierarchical part of a superordinate simulation analysis model; and
wherein the first data object comprises data that will cause the first processor to deny access to the further processable data of the third data object, but will permit access to the executable simulation of the fourth data object, such that the simulation analysis model is made hidden but executable to the corresponding processor.

16. The computer apparatus according to claim 15, wherein the apparatus further includes a second processor, and the first data object comprises data that will cause the first processor or the second processor, or both, to deny access to the further processable data of the third data object, but will permit access to the executable simulation of the fourth data object, such that the simulation analysis model is made hidden but executable to the corresponding.

* * * * *

UNITED STATES PATENT AND TRADEMARK OFFICE
CERTIFICATE OF CORRECTION

PATENT NO. : 8,661,419 B2  Page 1 of 1
APPLICATION NO. : 13/031203
DATED : February 25, 2014
INVENTOR(S) : Ralf Munzenberger and Matthias Dorfel It is certified that error appears in the above-identified patent and that said Letters Patent is hereby corrected as shown below:

Title Page, Item (57) Abstract at the sixth line, please delete "give" and replace with --given--.

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,661,419 B2 | Page 1 of 1 |
| APPLICATION NO. | : 13/031203 | |
| DATED | : February 25, 2014 | |
| INVENTOR(S) | : Ralf Munzenberger and Matthias Dorfel | |

It is certified that error appears in the above-identified patent and that said Letters Patent is hereby corrected as shown below:

In the Claims:

In column 8, lines 20-21, claim 1, please delete the word "operate"

In column 10, line 21, claim 16, please delete the words "to the corresponding"

Signed and Sealed this
Seventeenth Day of June, 2014

Michelle K. Lee
*Deputy Director of the United States Patent and Trademark Office*